United States Patent [19]

Klockner et al.

[11] Patent Number: 5,833,030
[45] Date of Patent: Nov. 10, 1998

[54] LIFTING-ROTATING DEVICE FOR PICKING UP A MOTOR VEHICLE

[75] Inventors: Lothar Klockner, Am Krusenhof 73, D-46286 Dorsten; Andreas Denstorf, Dortmund, both of Germany

[73] Assignees: AGR Abfallentsorgungs-Gesellschaft Ruhrgebiet GmbH, Essen; Lothar Klockner, Dorsten, both of Germany

[21] Appl. No.: 817,562
[22] PCT Filed: Oct. 12, 1995
[86] PCT No.: PCT/DE95/01404
    § 371 Date: Aug. 21, 1997
    § 102(e) Date: Aug. 21, 1997
[87] PCT Pub. No.: WO96/11874
    PCT Pub. Date: Apr. 25, 1996

[30] Foreign Application Priority Data

Oct. 14, 1994 [DE] Germany ............... 44 36 715.5

[51] Int. Cl.⁶ ............................................. B66F 7/06
[52] U.S. Cl. ................................... 187/211; 414/428
[58] Field of Search .......................... 187/203, 211, 187/210, 222, 269; 414/428, 733, 739

[56] References Cited

U.S. PATENT DOCUMENTS 2,792,139  5/1957  Conner ........................... 414/42.9
4,475,462 10/1984  Kabler et al. ...................... 105/149

FOREIGN PATENT DOCUMENTS

| 04 17 056 | 9/1990 | European Pat. Off. . |
| 15 14 801 | 3/1967 | France . |
| 20 50 361 | 4/1971 | France . |
| 23 77 863 | 7/1978 | France . |
| 17 81 464 | 7/1968 | Germany . |
| 25 16 038 | 4/1975 | Germany . |
| 26 47 227 | 10/1976 | Germany . |
| 81 15 083 | 5/1981 | Germany . |
| 38 08 121 | 3/1988 | Germany . |
| 89 06 742 | 6/1989 | Germany . |
| 93 09 288 | 6/1993 | Germany . |
| 94 08 846 | 1/1994 | Germany . |

*Primary Examiner*—Keneth Noland
*Attorney, Agent, or Firm*—Herbert Dubno

[57] ABSTRACT

The invention concerns a lifting-rotating device for picking up a motor vehicle (14), in particular a passenger car, with a parallelogrammatic extension arm (11) which is articulated on a pillar (10) or a frame so as to pivot about the horizontal and at whose free end an extension arm tip (12) is articulated such that, when the parallelogrammatic extension arm (11) performs pivot movements about a horizontal, the tip (12) retains its set angle of inclination relative to the horizontal. The device further comprises a clamping unit (13) which is disposed at the free end of the extension arm tip (12) and is articulated on the latter so as to be rotatable about the horizontal relative to the extension arm tip (12).

12 Claims, 3 Drawing Sheets

LIFTING-ROTATING DEVICE FOR PICKING UP A MOTOR VEHICLE

CROSS REFERENCE TO RELATED APPLICATIONS

This application is a national stage of PCT/DE95/01404 filed 12 Oct., 1995 and based, in turn, upon German application P 44 36 715.5 filed 14 Oct., 1994 under the International Convention.

FIELD OF THE INVENTION

The invention relates to a lifting-rotating device for picking up a motor vehicle, particularly a passenger car.

BACKGROUND OF THE INVENTION

For environmental reasons, and also for the purpose of recycling as many scrap car parts as possible, it is necessary to disassemble the vehicles as much as possible and to separate the recyclable parts, making them available to the respective further processing opportunities.

This is different from the assembly of new vehicles, which either hanging from a transfer line or standing on a palette, can be moved from one work station to the next without endangering the working personnel. There are limits in the automation of dismantling old cars, since underneath the cars to be dismantled there are also parts which have been deformed by accidents or have become heavily corroded due to old age, so that automated dismantling is no longer possible. Particularly falling dirt or rust makes overhead dismantling difficult. In order to facilitate the dismantling process, it is desirable to provide lifting devices which not only lift the vehicle, but are also capable of rotating it while it is stopped, so that the bottom areas become laterally accessible.

OBJECT OF THE INVENTION

It is the object of the invention to create a lifting-rotating device of the aforementioned kind, which has a simple and robust construction and is easy to operate.

SUMMARY OF THE INVENTION

The apparatus of the invention has a parallelogram-shaped extension arm articulated on a column or frame which is pivotable about a horizontal and to whose free end a jib head is linked so that it maintains its set angular position while the parallelogram-shaped extension arm performs its pivoting motions about the horizontal. A clamping device is linked to the free end of the jib head, so that it can rotate horizontally with respect to the jib head. The advantage of the lifting-rotating device of the invention resides in the fact that, during the pivoting motions of the parallelogram-shaped extension arm, the motor vehicle secured at the clamping device maintains its angle of inclination in transverse direction to the longitudinal axis. The motor vehicle is pivotable about a horizontal axis of rotation by an angle of minimum 90°, depending on the position of the clamping device with respect to the jib head. The pivoting angle is limited only by the parallelogram-shaped extension arm on one side and by the jib head on the other side. Preferably the angle of rotation equals 105°.

According to a further embodiment of the invention, the parallelogram-shaped extension arm is pivotable by means of a lifting cylinder, whereby in the case of a single-lever extension arm the lifting cylinder engages on the same side where the jib head, the extension arm, the clamping device and the vehicle are located, or in the case of a two-lever parallelogram-shaped extension arm, the lifting cylinder engages on the corresponding opposite side.

In any case the parallelogram connecting rod has a point of rotation arranged on the column or frame with a horizontally set axis of rotation.

Preferably the lifting cylinder is linked with its first end to the column or frame—approximately in the base area and with its other end to the parallelogram-shaped extension arm outside the pivoting axis, preferably on the side facing away from the jib head. On this side, in order to support the pivoting motion under suspended load at the load arm, additional weights or receiving devices for corresponding counterweights (at the force arm) can be provided.

According to a further embodiment of the invention, the parallelogram connecting rod can also be fastened to the column or the frame so that it can be vertically lifted and lowered, i.e. the link point about which the rotation is performed is height-adjustable.

According to a further embodiment the free ends of the arm of the parallelogram-shaped extension arm are connected by a crossbar, which in addition serves as a support for a lifting cylinder, whose other end opposite to the support is connected with the clamping device outside the link point of the jib head. By means of this lifting cylinder it is possible to perform rotation movements of the clamping device, to which the vehicle is attached.

For reasons of stability, the parallelogram-shaped extension arm consist of respective extension arm pairs, linked to the column, each of them pivotable on opposite sides of the column. Preferably the respective pairs of extension arms are connected to each other at their free ends by a crossbar, so that they can be operated only at equal pivoting angles.

In order to simplify the construction, the clamping device is designed as a U-shaped section, to whose free wing ends outwardly pivotable or projectable pins or eyelets for the insertion of bolts are arranged, for gripping the roof of a motor vehicle from both sides. This clamping device is easy to operate: First the U-shaped section is lowered with its base onto the roof of the motor vehicle, after which pins are swung or projected outward or bolts are inserted in the eyelets, which afterwards grip the vehicle roof from underneath. In addition the clamping device can have a support arm parallel to one of the U-wings, surpassing it lengthwise or prolonging the same. This arm serves for supporting the lateral area of the motor vehicle attached to the clamping device, as much as possible in the area of the body frame, during its rotation. After the motor vehicle was rotated by 90° or more, it comes to rest firmly on this support arm.

In order to prevent this support arm from hindering the work to be done on the respective side of the motor vehicle, according to a further development of the invention it is provided that the support arm be arranged horizontally rotatable at the U-shaped clamping device, but so that it can be locked. This has the advantage that in certain cases the support arm can be swung away.

In an alternate embodiment to the outwardly swingable or projectable pin or the insertable bolt, it is provided that the clamping device consist of a plate, having lifting cylinders at the opposite sides, whose ends which are freely movable with respect to the plate have an eyelet through which a common lifting rod can slide. In this case the plate is lowered onto the roof of the motor vehicle, the lifting cylinders are subsequently pushed down, their eyelets are arranged with their openings at the same level so that a common lifting rod per opposite pair of lifting cylinders can be inserted. After that the cylinders are again brought close to the plate, so that the lifting rod presses the motor vehicle roof against the mentioned plate.

The lifting cylinders are preferably hydraulic or pneumatic cylinders, which optionally can be actuated by a common drive.

The described device is simple and robust and therefore relatively trouble free, and also easy to handle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
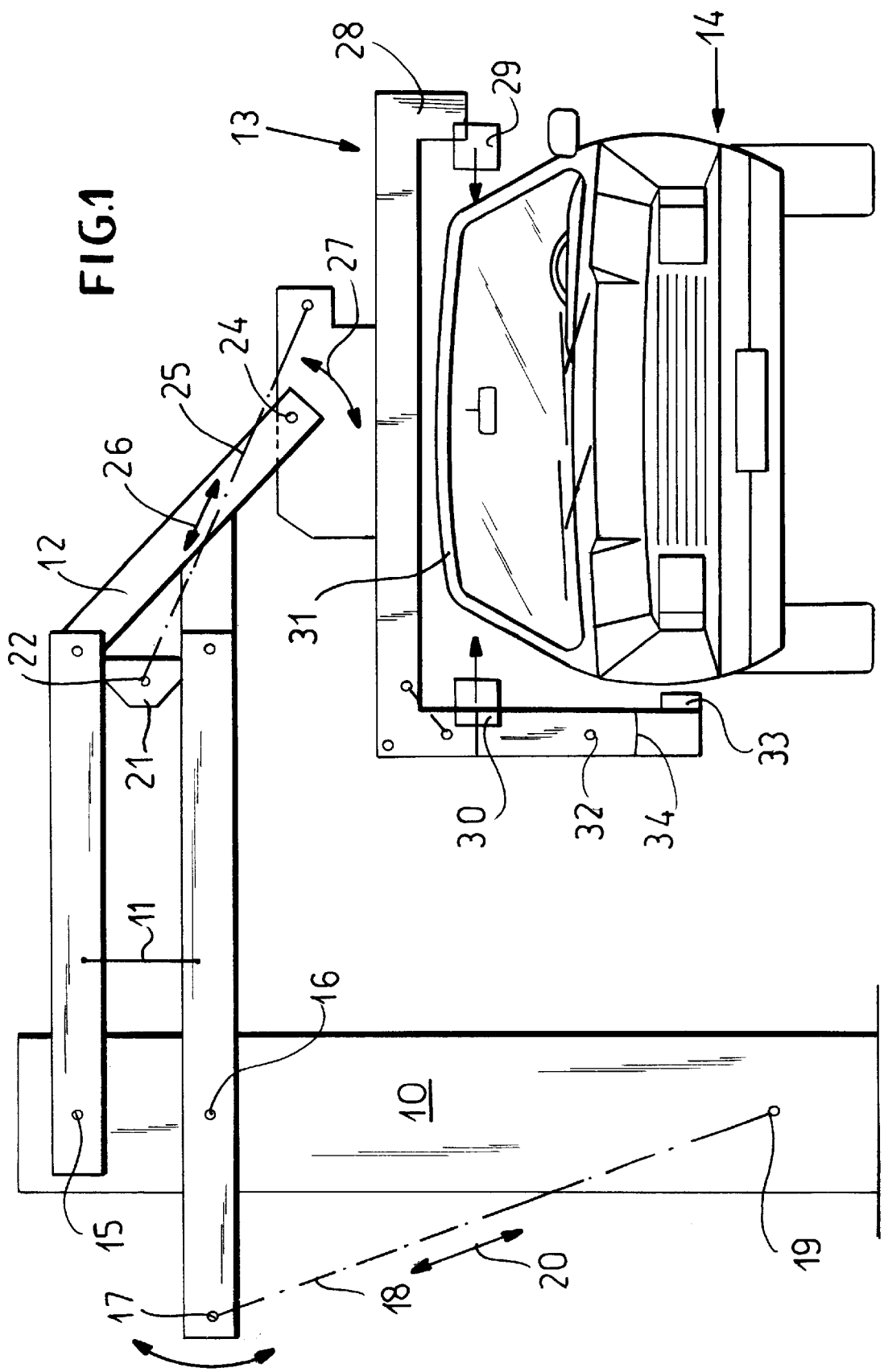
FIG. 1 is a diagrammatic front view of a lifting-rotating device according to the invention.

The essential parts of the lifting device of the invention are a vertical column 10, a parallelogramomatic arm 11, a jib head 12 linked to the free end of the latter, and a clamping device 13 for fastening the motor vehicle 14. The parallelogram-shaped extension arm consists of two extension arms, of which the upper extension arm is fastened to the column 10 so as to be pivotable about an axis 15. The lower extension arm is fastened to the column 10 so as to be pivotable about a rotation axis 16. The pivoting axes 15 and 16 are located at a distance and one above the other. The lower extension arm is designed as a two-arm lever, and has at its end a link point 17 for a lifting cylinder 18, whose end is linked to the base area of the column 10 at point 19. If the lifting cylinder 18 advances or retracts in the direction marked by the double arrow 20, the parallelogram-shaped extension arm 11 pivots in the manner indicated by the double arrow 26. At the free end of the load arm of the parallelogram-shaped extension arm, the extension arms are interconnected by a crossbar 21, in order to maintain the parallel distance. To the end of the parallelogram-shaped extension arm 11 a jib head 12 is linked, which at its free end facing away from the column 10 has an articulation point for the clamping device 13.

Between the linking points 22 on the crossbar 21 and a linking point 24 located outside the linking point 23 on the clamping device, a lifting cylinder is arranged which can advance and retract in the direction of double arrow 26. At each lifting motion the clamping device is pivoted in the direction of double arrow 27, whereby it entrains the vehicle 14 fastened there. The clamping device has a section 28 with a U-shaped cross section, which has at the free ends of each wing projectable and retractable pins 29 and 30. These pins can be projected so that they can grip the vehicle roof from underneath, whereby it is locked against the clamping device 13. The clamping device 13 has a lateral support arm 32, which at its lower side has a contact surface 33 made for instance of rubber or plastic material. This support arm is linked to the clamping device, preferably pivotable in the direction of double arrow 34 and serves for relieving the roof spars of the attached vehicle 14 during rotation.

Figure 2:
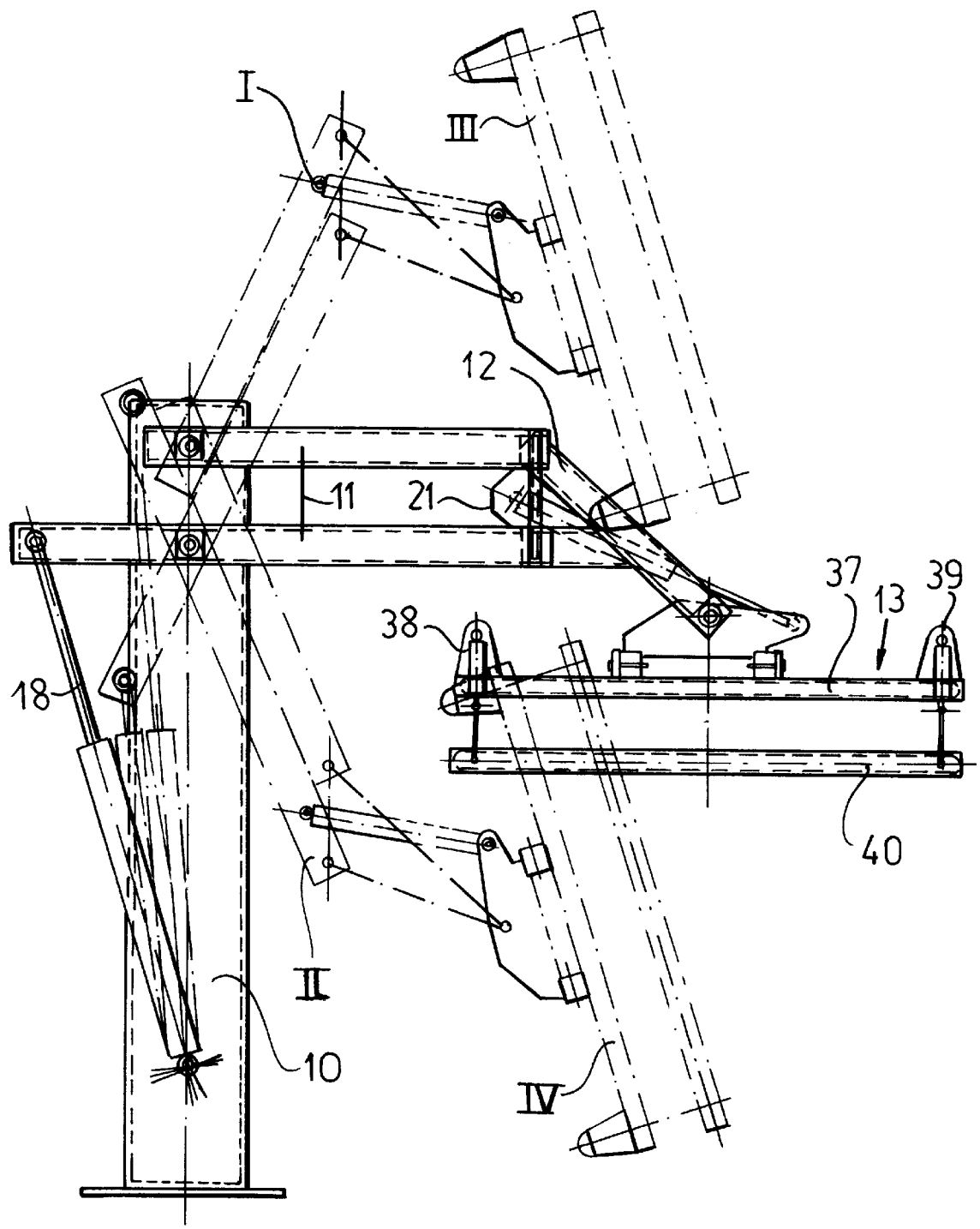
FIG. 2 is a diagram of a lifting-rotating device in various working positions.
Figure 3:
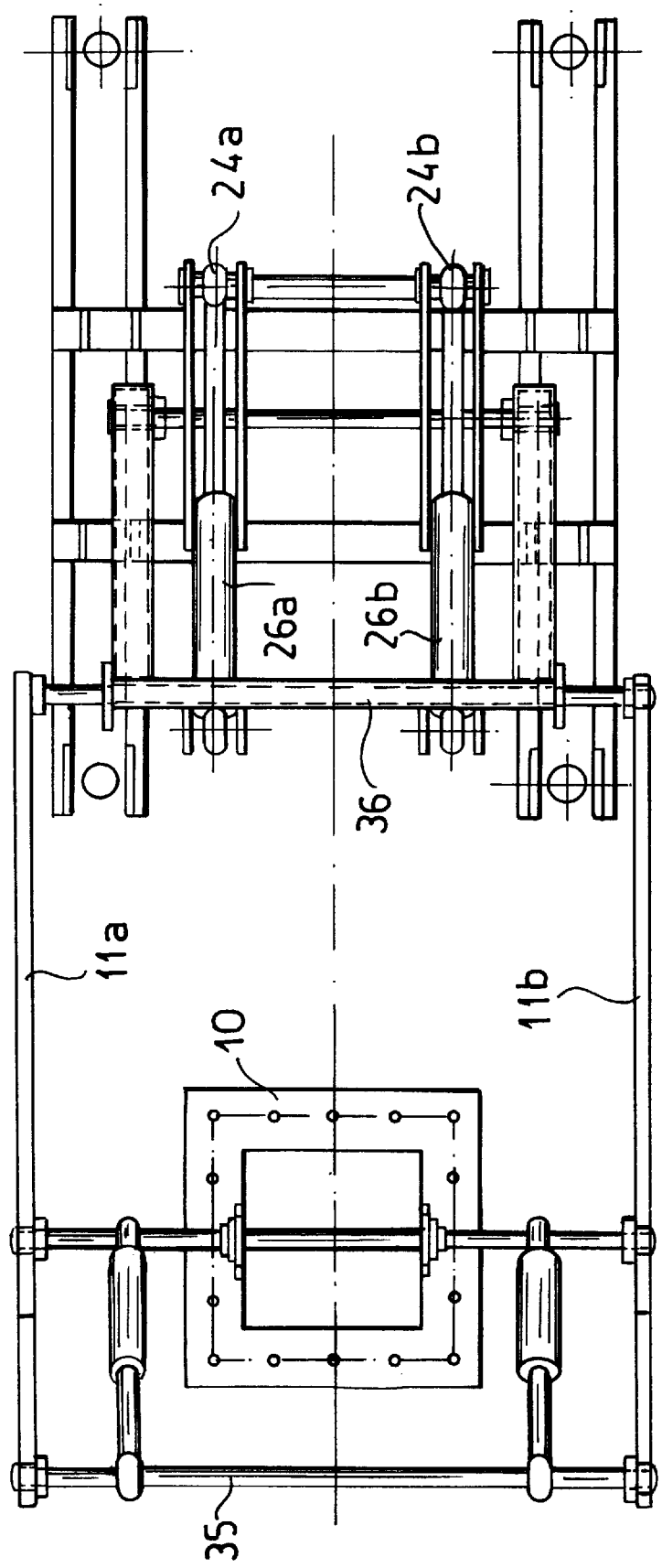
FIG. 3 is a top view of the device according to FIG. 2.

In the embodiment according to FIGS. 2 and 3, as can be seen from FIG. 3, parallelogram-shaped extension arms 11a and 11b are rotatable supported on both sides of the column 10. The extension arms 11a and 11b are connected by crossbars 35 and 36. The crossbar 36 serves at the same time as a support for cylinders 26a and 26b, which replace the previously lifting cylinders 25. Correspondingly the clamping device 13 has two link points 24a and 24b.

Differently from the previously device, the clamping device 13 has a plate 37, to whose ends lifting 38 and 39 are respectively mounted, having eyelets at their free extendable ends through which a bar 40 can be pushed. In order to lock the vehicle roof 31, the lifting cylinders 38 and 39 are pushed outward, the lifting rods 40 are slid through the eyelets, after which the lifting cylinders 38 and 39 are again retracted as soon as possible, until the lifting rod 40 presses the vehicle roof 31 firmly against the plate 37.

In the case of a square plate 37, suitably at least four lifting cylinders and two lifting rods 40 are used.

The lifting device works as follows: The vehicle 14 is at first positioned underneath the open clamping device 13, which in certain cases can take place with the assistance of a gravity roller conveyor or any other kind of transfer line. For fastening the clamping device 13, the clamping device, i.e. the U-shaped section 28 or the plate 37, is lowered onto the vehicle roof 31 and the vehicle roof is fastened to the clamping device 13 with the assistance of the lifting rod 40 or the pins 29 or 30. The locking of the vehicle roof 31 to the clamping device 13 can optionally be done by involving a hydraulic mechanism, such as described in the case of hydraulic cylinders 38 and 39. The pins 29 and 30 can also be designed as pivotable hooks or the like, which after the pivoting of the vehicle roof 31 reach underneath to lock it. Basically it is also possible to provide the clamping device with pivotable arms, which reach under the bottom of the vehicle and optionally by means of suitable lifting cylinders press it firmly against the bottom side of a receiving plate 37 or a profile 28. It is essential to achieve a frictional and/or a positive connection of the motor vehicle 14 with the clamping device, prior to its being swung about.

By actuating the lifting cylinders 18, the parallelogram-shaped extension arm 11 is moved from its horizontal position to the position I, wherein the free end of the extension arm 11 is raised or to the position II by lowering the free end of the extension arm 11. In this pivoting motion of the extension arm 11, the motor vehicle 14 does not change its horizontal position. When the lifting cylinder 26 is retracted, the clamping device 12 perform a rotary motion by about 105°, until it assumes the position III. The motor vehicle is swung in a corresponding manner, so that the motor vehicle is rotated by 105° about its longitudinal axis. During the subsequent lowering of the jib heads from position I to position II, this position is kept correspondingly to the position illustration IV, so that the operator of the lifting-rotating device can bring the motor vehicle to the desired height, without changing the angle of rotation set by means of the lifting cylinder 26. All lifting cylinders or other parts involved in the pivoting motions are preferably actuated by hydraulic or pneumatic means.

The advantages of the lifting-rotating device of the invention reside particularly in the fact that all the activities performed on the vehicle as overhead work can be executed ergonomically after the rotation of the motor vehicle. By eliminating the overhead work the operational safety is enhanced. The vehicle is accessible from all sides, depending on the angle of rotation and the locking at the clamping device, particularly the bottom of the vehicle after the vehicle is swung about its longitudinal axis. The device of the invention is cheaper to produce than the heretofore known lifting-rotating devices and is applicable to all passenger cars, all-terrain vehicles and small busses, without requiring intermediate retrofitting.

We claim:

1. A lifting rotating device for picking up a motor vehicle, particularly a passenger car, comprising a parallelogram-shaped extension arm articulated to a column or a frame so as to pivot about a horizontal and to a free end of which a jib head is linked so that during the pivoting motions of the parallelogram-shaped extension arm it maintains its set inclination angle with respect to the horizontal, and with a clamping device at the free end of the jib head which is linked to the jib head so that it can rotate about a horizontal with respect to the jib head.

2. The lifting-rotating device according to claim 1, wherein the parallelogram-shaped extension arm is pivotable by means of a lifting cylinder.

3. The lifting-rotating device according to claim 2, wherein the lifting cylinder is linked with its first end to the column or the frame and with its other end to the parallelogram-shaped extension arm outside the pivoting axis.

4. The lifting-rotating device according to claim 1 wherein the parallelogram-shaped extension arm is fastened to the column or frame so that it can be raised and lowered vertically.

5. The lifting-rotating device according to claim 1 wherein the free ends of the extension arms of the parallelogram-shaped extension arm are interconnected by a crossbar, which at the same time serves for the support of a lifting cylinder, whose other end is connected with the clamping device outside the link point of the jib head.

6. The lifting-rotating device according to claim 1 wherein the parallelogram-shaped extension arm consists of respective extension arm pairs, each of them being pivotably linked to the column on opposite sides of the column.

7. The lifting-rotating device according to claim 6 wherein the respective extension arm pairs are interconnected at their free ends by a crossbar.

8. The lifting-rotating mechanism according to claim 1 wherein the clamping device has a section with a U-shaped cross section, to each of whose free wings ends outwardly pivoting or projecting pins or eyelets are arranged for inserting of bolts for the bilateral gripping of a motor vehicle roof.

9. The lifting-rotating device according to claim 8 wherein the clamping device has a support arm parallel to one of the U-wings surpassing the same in length or prolonging it.

10. The lifting-rotating device according to claim 9 wherein the support arm is lockably linked to the U-shaped clamping device so as to be rotatable about a horizontal.

11. The lifting-rotating device according to claim 1 wherein the clamping device consists of a plate, at whose opposite sides lifting cylinders have been arranged, whose free ends movable with respect to the plate have an eyelet for receiving a common lifting rod.

12. The lifting-rotating device according to claim 2 wherein the lifting cylinders are hydraulic or pneumatic cylinders.

* * * * *